United States Patent Office 3,600,397
Patented Aug. 17, 1971

3,600,397
CERTAIN BENZOTRIAZOLYLPHENOXY TIN COMPOUNDS
Toshio Seki, Osaka-shi, Kozaburo Suzuki, Kobe-shi, and Takashi Matsuzaki, Osaka-shi, Japan, assignors to Nitto Kasei Co., Ltd., Osaka, Japan
No Drawing. Filed Aug. 25, 1966, Ser. No. 574,924
Claims priority, application Japan, Aug. 25, 1965, 40/51,406
Int. Cl. C07d 55/04
U.S. Cl. 260—299         22 Claims

ABSTRACT OF THE DISCLOSURE

Compounds of the formula

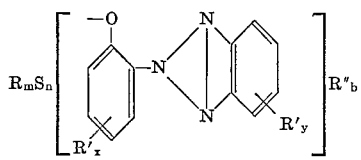

their preparation and their use as U.V. stabilizers for synthetic resins.

---

This invention relates to novel organotin compounds, to the preparation of such compounds, and to the use of these compounds as stabilizers for synthetic resins.

It is known that certain organic compounds may be added to various synthetic resins to improve their resistance to deterioration in physical properties on exposure to ultraviolet light. However, many of these compounds may be characterized as unsatisfactory because they are subject to thermal decomposition, volatilization, or sublimation during the process of producing films, fibers, or other molded articles which are heated. These compounds have a further defect because they actually promote the heat-deterioration of many synthetic resins, such as polyvinyl chlorides. When the syntethic resins are processed at a temperature above 200° C., these defects become even more pronounced. In addition, when these known stabilizers are added to fibers which are to be washed or dry-cleaned, considerable discoloration due to the reaction of extremely small quantities of metal ion or cleaning material with the stabilizers may often be observed.

According to the present invention, these adverse effects may be reduced or eliminated by employing a new class of organotin compounds as light stabilizers.

It is an object of this invention to provide novel organotin compounds. It is also an object of this invention to provide a method for preparing novel organotin compounds. Still another object of this invention is to provide stabilized synthetic resins containing novel organotin compounds and methods of preparing such stabilized resins. Other objects will be apparent from the following description.

According to certain of its aspects, the method of improving light fastness of synthetic resins of this invention comprises adding to the synthetic resins one or more novel organotin compounds of the general formula:

(I)  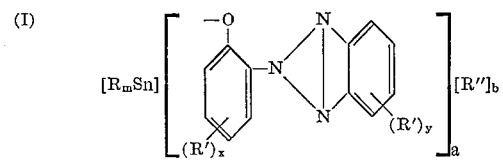

wherein (a) each R is independently selected from the group consisting of an alkyl of 1–18 carbon atoms cycloalkyl, aryl, or benzyl, (b) each R' is independently selected from the group consisting of an alkyl of 1–12 carbon atoms, alkoxy, hydrogen, and halogen, (c) each R'' is bonded to a tin atom and is selected from the group consisting of the residue of a carboxylic acid of 1–18 carbon atoms, mercaptan, mercapto acid ester, monoester maleate and a hydroxyl group, (d) each of $a$ and $m$ is an integer 1–3, $b$ is 0 or an integer 1–2, $x$ and $y$ are 0 or integers 1–3, and $a+b+m=4$. In all formulas, unsubstituted valences of the atoms are bonded to hydrogen atoms.

The organotin compounds having the aforesaid general formula may be prepared by heating a compound of the formula:

(II)  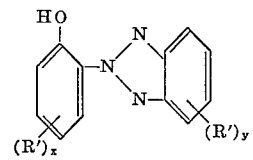

wherein R', $x$, and $y$ have the same values as described for the foregoing general Formula I, with a member selected from the group consisting of a bis-triorganotin oxide, a triorganotin hydroxide, a diorganotin oxide, or mono-organotin oxide in an inert solvent medium such as benzene, toluene, etc. Instead of the organotin oxides, tri-, di-, or mono-organotin alkoxides may be employed in the reaction. Other compounds within the general Formula I may be prepared by heating a triazole of Formula II with an organotin oxide, or a tri-, di-, or mono-organotin alkoxide in the presence of a mercaptan, mercapto acid ester, carboxylic acid, or monoester maleate.

The novel organotin compounds formed by practice of this invention are colorless to light yellow, crystalline or non-crystalline substances, depending upon the kind of R, R', and R'' radicals, and the value of $a$, $b$, $m$, $x$, and $y$ in the foregoing general Formula I. The compounds are soluble in organic solvents having boiling points in the range of 40° C. to 300° C., e.g. aromatic hydrocarbon, alcohol, ether, ester, ketone, petroleum hydrocarbon, etc.

Examples of the organotin compounds which are within the scope of the invention and which are suitable for use as light stabilizers include the following:

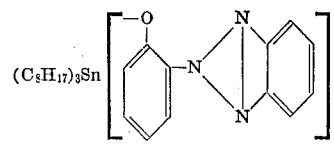

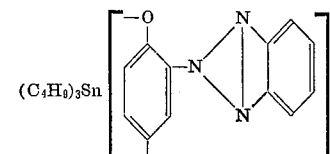

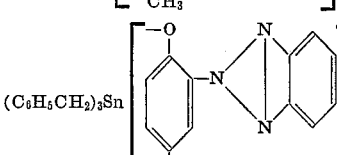

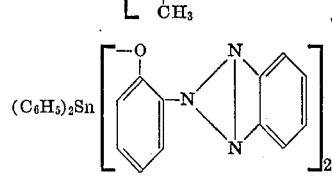

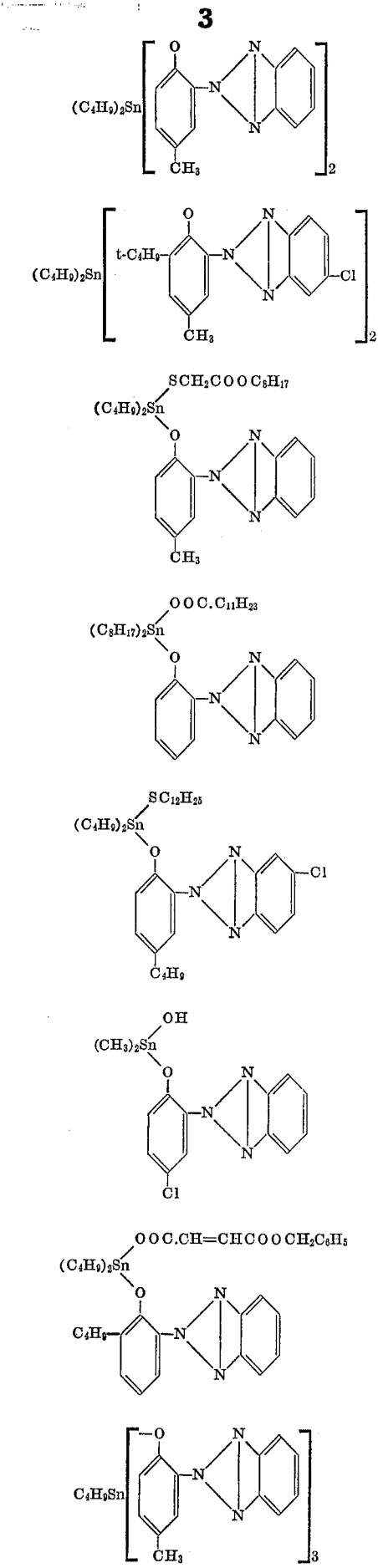

In the above examples, all unsatisfied valences are attached to hydrogen atoms.

These ultraviolet absorbers may be added to synthetic resins in several ways. For instance, the ultraviolet absorber may be added to the synthetic resin reaction mixture before the preparation of the synthetic resin after which the admixture is polymerized and molded into films, fibers or other articles or it may be added to the synthetic resin together with other additives such as a stabilizer, an anti-oxidant, a colorant, a mold lubricant, etc. by mixers, e.g. a ribbon blender, a high-speed mixer, a stirring mixer, etc. after which the mixture is molded into films, fibers, or other articles. In addition, films, fibers, or other articles may be treated with solutions, suspensions or emulsions of the ultraviolet absorbers by immersing or spreading. It is also possible to apply by adding the ultraviolet absorbers to solutions, suspensions, or emulsions of the synthetic resins.

The synthetic resin which may be stabilized by the method of this invention include ABS (acrylonitrile-butadiene-styrene) resins, cellulose, cellulose derivatives, acetal resins, fluoroplastics, acrylic resins, chlorinated polyethers, alkyd resins, amino resins, urethane resins, epoxy resins, polyamide resins, phenoxy resins, furan resins, phenol resins, polyimides, polycarbonates, polyesters, polyethylenes, polypropylenes, polystyrenes, polyvinyl chlorides, synthetic rubbers, etc.

A preferred amount of the organotin compounds to be employed as the ultraviolet absorber in the process of this invention is in the range of 0.001 to 5% by weight based upon the weight of the synthetic resin, which will vary depending upon the kind of molded articles and the manner in which the organotin compounds are added.

The process of this invention is of great advantage to the production of synthetic resins when such resins are molded at a high temperature. This is a special commercial advantage, since conventional ultraviolet absorbers stimulate thermal decomposition, volatilization, etc. of resins when treated at a temperature above 170° C. When R″ in Formula I is the residue of mercaptan, mercapto acid ester, carboxylic acid or monoester maleate in the foregoing general formula, the ultraviolet absorbers of the invention can also impart resistance to heat to synthetic resins susceptible to the effects of thermal oxidation, e.g. ABS resins, chlorine-containing resins, polyolefins, etc.

In the following examples, there is provided a series of tests to demonstrate the effectiveness of the novel organotin compounds with regard to deteriorative effects of ultraviolet light on the synthetic resins stabilized in accordance with this invention, in comparison with the effects of various triazole compounds. Further comparisons are shown without any additives whatsoever. A black board which was set at an angle of 45° to the vertical and facing south was lined with test specimens, and exposed outside. For each specimen, the following properties were observed: lowering of impact strength by Du Pont type impact machine, discoloration, and degree of cracking. In the examples, all parts are by weight unless otherwise indicated. All unsatisfied valences in the formulas of the examples are, unless otherwise indicated, understood to be bonded to hydrogen atoms.

The following examples are submitted for the purpose of illustration only and are not to be construed as limiting the scope of the invention in any way.

EXAMPLE 1

Two-tenths mole of 2-(2'-hydroxyl phenyl)-benzotriazole (A) was reacted with 1/10 mole of dibutyltin dimethoxide in 200 cc. of toluene under reflux for 6 hours. The solvent was then distilled off under reduced pressure to give a compound (B) of the formula:

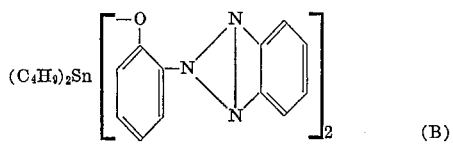

In order to provide a comparison as to the volatility by heat of the compounds (A) and (B), each compound was left in a Geer oven at 180° C. for 0.5 hour and the weight losses were examined. Only 1.2% of the compound (B) disappeared compared with a 12% loss of the compound (A). The infra-red spectra of the compound (B) were almost the same before and after the last treatment.

0.5 gram of the compound (B) was added as an ultraviolet absorber to 100 grams of styrene, the mixture was polymerized by heating at 100° C. for 2 days, and a sheet was made from the thus-obtained polymer. The yellowing degree of the sheet was about 1/40 of that of the control sheet which was made by the same procedure as above but not containing the ultraviolet absorber.

EXAMPLE 2

Two-tenths mole of 2-(2'-hydroxy-5'-methyl phenyl)-benzotriazole (C) was reacted with 1/10 mole of bis-(tributyltin)-oxide in 200 cc. of benzene under reflux for 6 hours. The benzene was then distilled off under reduced pressure to give a compound (D) of the formula:

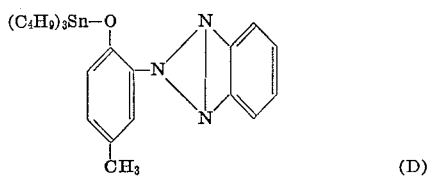

The compounds (C) and (D) were tested for volatility by the same procedure as in Example 1 and gave the following weight-loss results: (C), 8.7%; (D), only 1.6%.

A film of polyethylene glycol terephthalate having a thickness of 0.05 mm. was immersed in an acetone solution containing 2% by weight of the compound (D) at 10° C. for 30 seconds, and was dried at 180° C. for 30 seconds. The time at which the film obtained became fragile was more than 3 times the time at which the untreated film did so when they were exposed to ultraviolet light.

EXAMPLE 3

Two-tenths mole of 2-(2'-hydroxy phenyl)-5-chlorobenzotriazole (E) was reacted with 1/10 mole of dibutyltin oxide in 200 cc. of toluene under reflux for 6 hours. The toluene was then distilled off under reduced pressure to give a compound (F) of the formula:

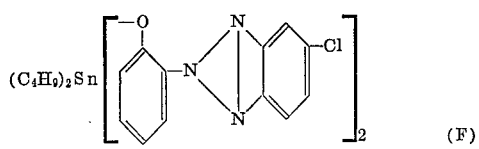

The compounds (E) and (F) were tested for volatility by the same procedure as in Example 1 and gave the following weight-losses: (E), 4.2%; (F), only 0.9%.

100 milligrams of benzoyl peroxide and 0.5 gram of the compound (F) were mixed together in 400 cc. of methyl methacrylate and the solution was polymerized and molded into hard plates of 2 mm. thickness. Denoted by impact value, the brittleness on exposure to ultraviolet light of the thus obtained plate was 1/5 of that of a plate prepared by the same procedure as above but not containing the ultraviolet absorber.

EXAMPLE 4

Two-tenths mole of 2-(2'-hydroxy-5'-methyl phenyl)-benzotriazole (C) was reacted with 1/10 mole of dibutyltin oxide in 200 cc. of benzene under reflux for 5 hours. The benzene was then distilled off under reduced pressure to give a compound (H) of the formula:

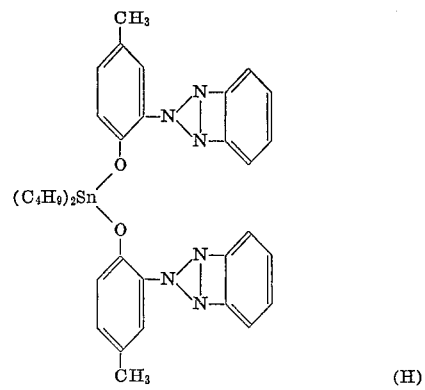

The compounds (C) and (H) were tested for volatility by the same procedure as in Example 1 and gave the following weight-losses: (C) 8.7%, (H), only 1.7%.

0.2 part of the compound (H) was added to 2,000 parts of 5% polyvinyl chloride solution in α-methylnaphthalene and the solution was spread out on a glass plate. The α-methylnaphthalene was then stripped off from said glass plate at 180° C. for 10 minutes under reduced pressure to form a colorless, transparent thin film of polyvinyl chloride. This film was not discolored by exposure to sunlight for 12 months.

For comparison, a film without the compound (H) and another film with 0.2 part of the compound (C) were made by the same procedure as above. The initial colors of the two films were yellow, and became brown after exposure to the sunlight for 3 months in summer.

From these facts, it was concluded that the organotin compound (H) had extremely low volatility and that it rendered the polyvinyl chloride (which otherwise deteriorated) stable not only to light, but also to heat.

EXAMPLE 5

One-tenth mole of 2-(2'-hydroxy-3'-methyl phenyl)-benzotriazole (I) was reacted with 1/10 mole of dibutyltin dimethoxide and 1/10 mole of monobenzyl maleate in 200 cc. of toluene under reflux. The solvent was then distilled off under reduced pressure to give a compound (J) of the formula:

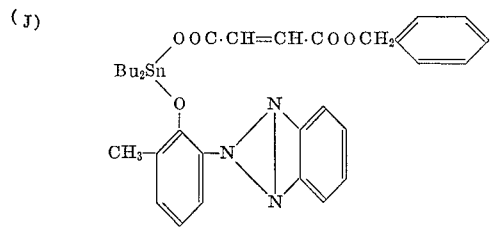

The compounds (I) and (J) were tested for volatility by the same procedure as in Example 1 and gave the following weight losses: (I), 15%; (J), 2.0%.

3 parts of dibutyltin-bis-(benzyl maleate) as a stabilizer, 1 part of dibutyltin dilaurate as a lubricant, 0.6 part of the compound (J), and 0.4 part of the compound (H) used in Example 4 were mixed together thoroughly with 100 parts of vinyl chloride resin. The mixture was sheeted on a mixing mill heated at a surface temperature of 180° C. The sheet obtained was colorless and transparent, and gave no coloration after exposure to the sunlight over a long period of 32 consecutive months.

For comparison, a sheet not containing the compounds (J) and (H) was prepared. Another sheet was prepared containing 1 part of the compound (I) instead of the compounds (J) and (H). The former was colorless and transparent, and was not discolored after exposure to the sunlight for 22 consecutive months, but the latter was light yellow in color, and turned brown after exposure to the sunlight for 12 months. From these results, it was found that the compound (I) might act no further as an ultraviolet absorber since the compound (I) had accelerated the thermal decomposition of the resins in the process of preparing the vinyl chloride resins.

EXAMPLE 6

Two-tenths mole of 2-(2'-hydroxy phenyl)-benzotriazole (A) was reacted with $\frac{1}{10}$ mole of monobutyltin oxide and $\frac{1}{10}$ mole of dodecyl mercaptan in 200 cc. of toluene under reflux for 6 hours. The toluene was then distilled off under reduced pressure to give a compound (K) of the formula:

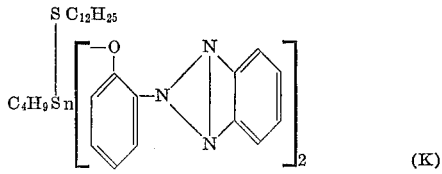

The compounds (A) and (K) were tested for volatility by the same procedure as in Example 1 and gave the following weight-losses: (A), 12%; (K), only 1.6%.

Five-tenths percent of each of the compounds (A) and (K) was added to ABS resins (acrylonitrile-butadiene-styrene terpolymer) and each mixture was injection molded into a flat plate. The plate containing the compound (A) was yellow in color but the plate containing the compound (K) was white in color, which shows that the compound (A) accelerated the thermal decomposition of the ABS resin. The time required to reduce the impact strength of the plate with the compound (K) to one-half by means of the irradiation of ultraviolet light was 9 to 11 times as long as that of the plate with the compound (A).

EXAMPLE 7

Two-tenths mole of 2-(2'-hydroxy-3'-t-butyl-5'-methylphenyl)-4-chlorobenzotriazole (L) was reacted with $\frac{1}{10}$ mole of tribenzyltin oxide in 200 cc. of heptane under reflux for 8 hours. The heptane was then distilled off under reduced pressure to give a compound (M) of the formula:

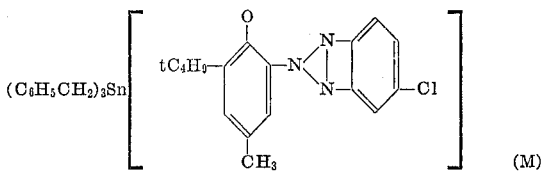

The compounds (L) and (M) were tested for volatility by the same procedure as in Example 1 and gave the following weight-losses: (L), 1.2%; (M), 0.4%.

Polypropylene containing 0.1% of 2,6-di-tertiary butyl-4-methyl phenol and 0.2% of dilauryl thiodipropionate, and the mixture of said polypropylene with 0.3% of the compound (M) were melt extruded. The fibers obtained were of pure white color in each case, whereas the fibers made from polypropylene with 0.3% of the compound (L) instead of the compound (M) was light yellow in color. These fibers were washed with anion or non-ionic cleanser and dried in the sun repeatedly. Only the fibers with the compound (L) became yellow in color in several washings and dryings. The time required for percentage maximum elongation of the fibers with the compound (M) to be reduced to half by the irradiation of ultraviolet light was 22 times as long as in the case of the fibers without any ultraviolet absorbers, and was 8 times as long as in the case of the fibers with the compound (L).

EXAMPLE 8

Two-tenths mole of 2-(2'-hydroxy diphenyl)-benzotriazole (A) was reacted with $\frac{1}{10}$ mole of dioctyltin oxide in 200 cc. of hexane under reflux for 4 hours. The hexane was then distilled off under reduced pressure to give a compound (N) of the formula:

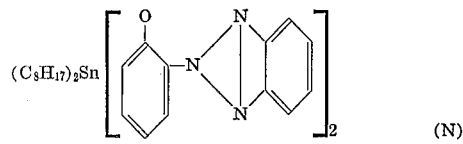

The volatile losses of the compounds (A) and (N), tested by the same procedure as in Example 1, were 12% and 1.9% respectively.

1.5% of the compound (N) was added to polyethylene, and the mixture was extruded into a film of 0.6 mm. thickness. For comparison, an additional film was prepared from polyethylene without any additives by the same technique. Both of the films were colorless. These films were exposed to ultraviolet light until their impact strength was reduced to one-half in order to test them for resistance to ultraviolet light. As a result, the polyethylene film containing the compound (N) had to be exposed 17 times as long as one containing the compound (A).

Although this invention has been illustrated by reference to specific examples, numerous changes and modifications thereof which clearly fall within the scope of the invention will be apparent to those skilled-in-the-art.

What is claimed is:

1. A compound of the formula:

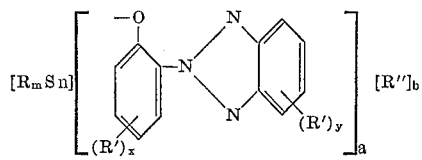

wherein:
(a) each R is independently selected from the group consisting of an alkyl of 1–18 carbon atoms, cyclohexyl, phenyl, and benzyl,
(b) each R' is independently selected from the group consisting of an alkyl of 1–12 carbon atoms, methoxy, hydrogen, and halogen,
(c) each R" is bonded to the tin atom and is selected from the group consisting of alkanoyloxy of 1–18 carbon atoms, alkylthio of up to 12 carbon atoms, alkyloxycarbonylmethylthio wherein the alkyl is up to 8 carbons, benzyl maleate, and hydroxyl groups,
(d) each of $a$ and $m$ is an integer 1–3, $b$ is 0 or an integer 1–2, $x$ and $y$ are 0 or integers 1–3, and $a+b+m=4$, and
(e) all unsubstituted valences of the atoms in Formula I are bonded to hydrogen atoms.

2. A compound according to claim 1 wherein $b$ is 0, R is an alkyl group of 1–18 carbon atoms and each R' is independently an alkyl group of 1–12 carbon atoms.

3. The compound:

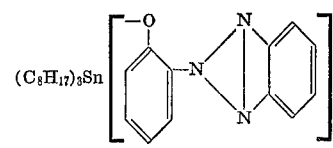

4. The compound:
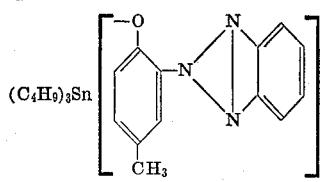
5. The compound:
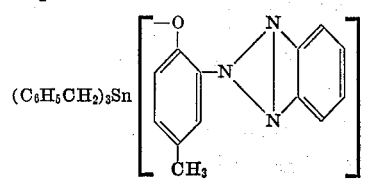
6. The compound:
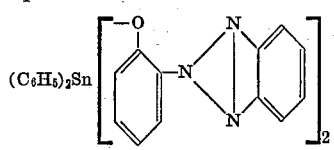
7. The compound:
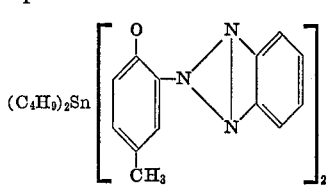
8. The compound:
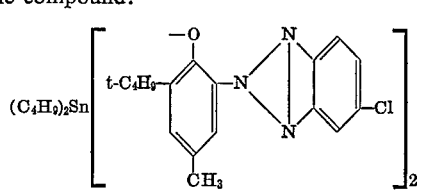
9. The compound:
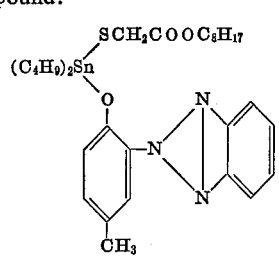
10. The compound:
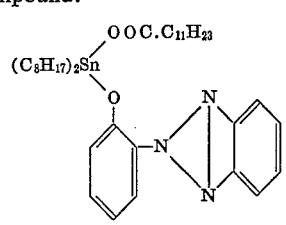
11. The compound:
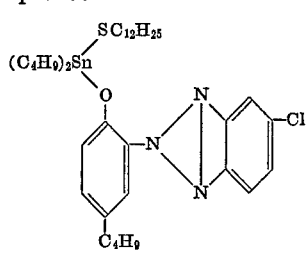
12. The compound:
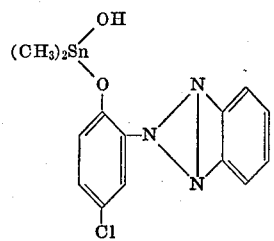
13. The compound:
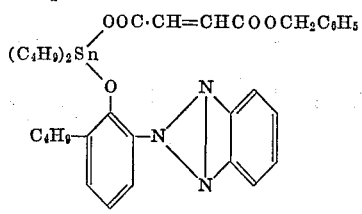
14. The compound:
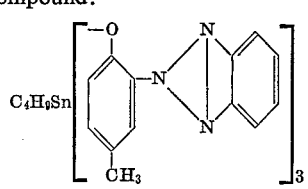
15. The compound:
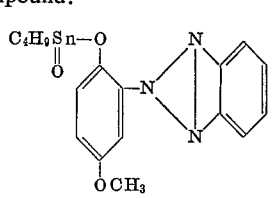
16. The compound:
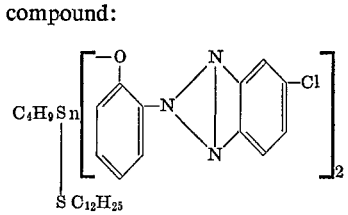
17. The compound:
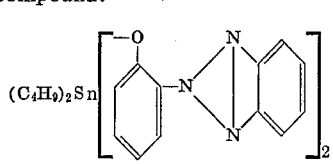
18. The compound:
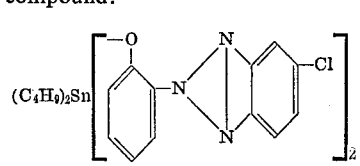
19. The compound:
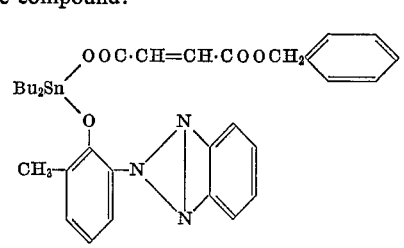

20. The compound:
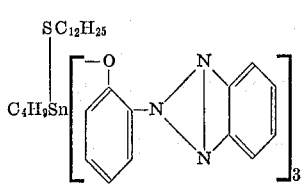
21. The compound:
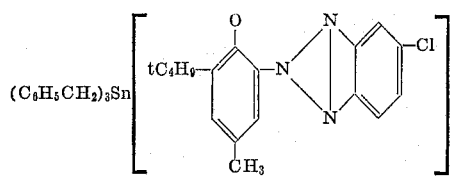
22. The compound:
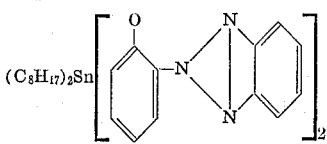
References Cited
UNITED STATES PATENTS
| | | | |
|---|---|---|---|
| 2,912,448 | 11/1959 | Ramsden | 260—429.7 |
| 2,977,379 | 3/1961 | Dorfelt et al. | 260—429.7 |
| 3,183,238 | 5/1965 | Barbanson | 260—299 |
ALEX MAZEL, Primary Examiner
R. J. GALLAGHER, Assistant Examiner
U.S. Cl. X.R.
252—405; 260—45.8, 240, 308